(12) United States Patent
Sato et al.

(10) Patent No.: US 7,430,076 B2
(45) Date of Patent: Sep. 30, 2008

(54) DIFFRACTION ELEMENT

(75) Inventors: Hiromasa Sato, Fukushima (JP);
Yoshiharu Ooi, Fukushima (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 10/798,556

(22) Filed: Mar. 12, 2004

(65) Prior Publication Data

US 2004/0169929 A1 Sep. 2, 2004

Related U.S. Application Data

(63) Continuation of application No. PCT/JP02/09370, filed on Sep. 12, 2002.

(30) Foreign Application Priority Data

Sep. 13, 2001 (JP) ............... 2001-278063
Apr. 15, 2002 (JP) ............... 2002-112162

(51) Int. Cl.
G02B 5/18 (2006.01)
G11B 7/135 (2006.01)

(52) U.S. Cl. ............... 359/569; 359/566; 369/112.05

(58) Field of Classification Search ............... 359/576, 359/566, 569, 571, 15, 572, 495, 34; 356/305, 356/328; 385/37; 372/102, 50.1, 43; 369/112.03, 369/112.05
See application file for complete search history.

(56) References Cited

U.S. PATENT DOCUMENTS 5,515,354 A 5/1996 Miyake et al.
5,786,890 A 7/1998 Noh
5,907,436 A * 5/1999 Perry et al. ............... 359/576
5,914,811 A * 6/1999 Chen et al. ............... 359/495

(Continued)

FOREIGN PATENT DOCUMENTS

DE 199 60 056 A1 6/2001

(Continued)

OTHER PUBLICATIONS

U.S. Appl. No. 11/256,053, filed Oct. 24, 2005, Sato et al.

(Continued)

*Primary Examiner*—Audrey Y Chang
(74) *Attorney, Agent, or Firm*—Oblon, Spivak, McClelland, Maier & Neustadt, P.C.

(57) ABSTRACT

A diffraction element having concave/convex-like diffraction gratings in its two surfaces from which at least two separated light beams can be taken in the same direction without changing largely the propagating direction of diffracted light even if the temperature of the operating environment changes. A diffraction grating having a concave/convex shape in cross-section is formed in the incoming-side surface of the transparent substrate and two diffraction gratings of concave/convex shape in cross-section are formed in the outgoing-side surface wherein the grating pitch of the first one is made equal to the grating pitch of one of the second ones.

In addition, a reflection type diffraction element exhibiting a good wavelength dependence of diffraction efficiency without being dependent largely on the direction of polarization of an incoming light is provided. A pseudo sawtooth-like diffraction grating is formed in either surface of the transparent substrate, a reflective film is formed on a diffraction grating portion, and an antireflective film is formed on the opposite surface.

5 Claims, 10 Drawing Sheets

U.S. PATENT DOCUMENTS

| | | | | |
|---|---|---|---|---|
| 5,999,318 | A | * | 12/1999 | Morton et al. ............... 359/572 |
| 6,728,034 | B1 | * | 4/2004 | Nakanishi et al. ........... 359/566 |
| 2004/0169929 | A1 | | 9/2004 | Sato et al. |

FOREIGN PATENT DOCUMENTS

| EP | 0 726 568 A2 | 8/1996 |
|---|---|---|
| JP | 5-232321 | 9/1993 |
| JP | 5-346502 | 12/1993 |
| JP | 6-317705 | 11/1994 |
| JP | 7-239407 | 9/1995 |
| JP | 10 69673 | 3/1998 |
| JP | 2001-59905 | 3/2001 |

OTHER PUBLICATIONS

U.S. Appl. No. 11/627,720, filed Jan. 26, 2007, Sato.

* cited by examiner

US 7,430,076 B2

DIFFRACTION ELEMENT

TECHNICAL FIELD

The present invention relates to a diffraction element, particularly, a diffraction element having a concave/convex-like diffraction grating in its both surfaces usable for an apparatus for measuring the characteristics of an incoming light by separating the incoming light to the diffraction element, and a reflection type diffraction element used for an apparatus for optical multiple communication, spectroscopic measurement and so on.

BACKGROUND ART

Description will first be made as to a diffraction element having a concave/convex-like diffraction grating in its two surfaces. As methods for measuring the characteristics of an incoming light by separating a part of the incoming light to the diffraction element into a different direction, there has been known a system for measuring light by separating it by means of a prism. FIG. 6 is an illustration of separating light by means of a corner-cube prism wherein a prism 601 comprises two corner-cube prisms; a multilayer film 602 designed so as to obtain a predetermined amount of separated light is coated on the inclined plane of either prism, and the two prisms are jointed by a resinous bonding material 603. When an incoming light 604 is incident into inclined planes of the two prisms at 45°, a part of the incoming light is separated as a first reflected light 605 perpendicular to the incoming light 604, by the multilayer film 602. In order to further separate the first reflected light 605, it is necessary to provide a prism on the light path. For example, a prism 607 having a multilayer film 606 designed to obtain an appropriate amount of separated light is provided on the light path of the first reflected light 605. By this arrangement, the incoming light can be separated into three groups of light beams: the incoming light 604, the first reflected light 605 and the second reflected light 608. Each of the separated first reflected light 605 and the second reflected light 608 is introduced into each of different measuring apparatuses 609, 610 so that characteristics such as intensities of the incoming light can be measured independently.

Next, a reflection type diffraction element will be described. There is a method for measuring the intensity of an incoming light containing various wavelengths by separating and diffracting the light containing various wavelengths into different directions depending on the wavelengths. As the method for separating the light based on its wavelengths, there has been known a method using a reflection type diffraction element having a sawtooth-like grating in a cross-sectional shape.

FIG. 10 shows an example of the structure of a conventional reflection type diffraction element using a resin. This reflection type diffraction element 80 is formed by pressing a metal mold, in which an offset sawtooth-like diffraction grating comprising 250 to 1,600 linear sawtooth-like grating portions per mm is precisely formed, to a resin formed on a surface of a glass substrate 801 to transfer the surface configuration of the metal mold to the resin to thereby prepare a sawtooth-like diffraction grating 802, and then, by coating a high-reflective layer 803 thereon. The diffraction element is adapted to receive light from the side of the sawtooth-like diffraction grating 802.

As a diffraction grating having the same function, there is a pseudo sawtooth-like diffraction grating in which the sawtooth-like shape is approximated by stairs. This device is prepared by using techniques of photolithography and dry etching. FIG. 11 shows a reflection type diffraction element prepared by these techniques. In the same manner as shown in FIG. 10, a pseudo sawtooth-like diffraction grating 902 is formed on a glass substrate 901 and a reflective layer 903 is coated thereon whereby a reflection type sawtooth-like diffraction element 90 is provided. In FIGS. 10 and 11, arrow marks of solid line indicate an incoming light, arrow marks of one-dotted chain line indicate a reflected light and arrow marks of broken line indicate a 1st order diffraction light, respectively. The diffraction element used here is adapted to receive light from the side of the reflection type diffraction element 90.

As materials for these diffraction gratings, a glass substrate, an inorganic film or the like can be used other than the resin as used in the embodiment shown in FIG. 10.

Since these elements are reflection type diffraction elements, an incoming light is separated so as to be reflectively diffracted. Accordingly, from structural restriction in many cases, light is incident, from an upper side of the diffraction elements, into the pseudo sawtooth-like or the sawtooth-like diffraction grating at an incident angle θ of from 30° to 45° with respect to the normal line set on each grating surface. FIGS. 12 and 13 show examples of the wavelength dependence of the diffraction efficiency of the reflection type diffraction elements each comprising the sawtooth-like diffraction grating using a resin or the pseudo sawtooth-like diffraction grating using an inorganic film when light is incident at θ=40°. Here, outlined circles denote an S-polarized light and black circles denote a P-polarized light in both Figures.

Description will first be made as to the diffraction element having concave/convex-like diffraction gratings in its two surfaces. Such element can separate an incoming light into two or more portions by using a plurality of corner-cube prisms as shown in FIG. 6. However, an additional prism is needed as the number of times of separation of the incoming light increases. Therefore, there was a problem that it was difficult to constitute the separation system having a reduced size and being excellent in mass production. Further, there was also a problem that it was difficult to lead two or more separated portions of light into the same direction because the corner-cube prism is adapted basically to separate light into an orthogonal direction (the reflected light is orthogonal with respect to the incoming light). In addition, since a resinous adhesive material was used for the prism, there was a problem of causing the deterioration of transmission/reflection characteristics due to the deterioration of the adhesive material or the contamination of the optical plane around the adhesive material due to evaporation of a component in the adhesive material if the prism was used for a long period or it was located in a poor environment.

Next, description will be made as to the reflection type diffraction element. When a resin having an excellent transferability is used as the material for the diffraction grating, there is obtainable a reflection type diffraction element in which the diffraction efficiency is not changed largely depending on the wavelength of light and is not influenced substantially by the polarization direction, as shown in FIG. 12. However, the use of such resin created a problem that the element was deteriorated in a condition of high temperature or high temperature/high humidity, hence durability was insufficient and it was usable only in limited circumstances. Further, since the element was produced by a precise transfer process, there was problems that productivity was low and an element of high performance could not be produced on a low price and a large scale.

On the other hand, in the reflection type diffraction element formed by processing the substrate composed of an inorganic material or an inorganic material formed on the substrate into a stair-like shape, the element which is reliable, excellent in productivity and inexpensive can be produced on a large scale production. However, in such reflection type diffraction element, the wavelength dependence of the diffraction efficiency depends largely on polarization directions as shown in FIG. 13. Accordingly, there is a large fluctuation in spectroscopic signals in practical use. Further, there are problems that it is necessary to reduce the incident angle in order to assure good polarization dependence and wavelength dependence with respect to an incoming light, and a large angle can not be provided between an incoming light and a diffracted light. Accordingly, there was restriction in designing the arrangement of the spectroscopic system.

In either element using a resinous film or an inorganic film, there was such a problem that when a highly reflective layer formed on a substrate surface was damaged or stained, the optical characteristics would be deteriorated remarkably. In addition, there was such a problem that when the high-reflective layer providing a sufficient reflecting property was formed, the original shape of the grating could not be kept depending on a state of adhesion of the layer and the characteristics according to designed values with respect to the grating could not be satisfied.

It is an object of the present invention to solve the above-mentioned problems and to provide a diffraction element, in particular, a diffraction element having concave/convex-like diffraction gratings in its two surfaces, which can be a small-sized light separating device excellent in mass production, wherein two separated portions of light can easily be taken in the same direction and influences little on the optical system by the adhesive around it.

Further, it is an object of the present invention to provide a reflection type diffraction element in which there is a low possibility of causing a change of the diffraction efficiency depending on the polarization direction and the wavelength of an incoming light and which is excellent in mass production and reliability.

DISCLOSURE OF THE INVENTION

In accordance with the present invention, there is provided a diffraction element comprising a diffraction grating having a concave/convex shape in cross-section formed in a surface or both surfaces of a transparent substrate, wherein the diffraction element is adapted to receive light through the surface of the transparent substrate, which is opposite to the surface in which the diffraction grating is formed, in a case that the diffraction grating is formed in either one surface, and is adapted to receive light through the surface, in which the diffraction grating is formed in its central region, of the transparent substrate, in a case that diffraction gratings are formed in the both surfaces wherein a diffraction grating is formed in the central region of at least one of the surfaces.

Further, there is provided the above-mentioned diffraction element comprising the transparent substrate and the diffraction gratings having a concave/convex shape in cross-section formed in the both surfaces of the transparent substrate, wherein an incoming-side surface, into which an external light is incident, in the both surfaces of the transparent substrate is provided with an incoming-side diffraction grating in its central region, and at least one outgoing-side diffraction grating is formed in an outgoing-side surface which is opposite to said incoming-side surface, and at least one of outgoing-side diffraction gratings is formed on the light path of the external light diffracted by said incoming-side diffraction grating, and the grating pitch thereof is substantially equal to the grating pitch of the incoming-side diffraction grating.

Further, there is provided the above-mentioned diffraction element wherein the diffraction grating is formed directly in the surface of the transparent substrate.

Further, there is provided the above-mentioned diffraction element wherein the diffraction grating is formed in an inorganic film formed on a surface of the transparent substrate.

Further, there is provided the above-mentioned diffraction element wherein at least one of the outgoing-side diffraction gratings, whose grating pitch is substantially equal to the grating pitch of the incoming-side diffraction grating, is a reflection type diffraction grating.

Further, there is provided the above-mentioned diffraction element wherein at least one of the outgoing-side diffraction gratings, whose grating pitch is substantially equal to the grating pitch of the incoming-side diffraction grating, is a diffraction grating having a saw-tooth like concave/convex portion or a pseudo sawtooth-like diffraction grating wherein a saw-tooth like shape is approximated by stairs.

Further, there is provided the above-mentioned diffraction element wherein in the pseudo sawtooth-like diffraction grating, the height or the depth of a step is different from the height or the depth of another step, these steps constituting the stairs.

Further, according to the present invention, there is provided a reflection type diffraction element comprising the above-mentioned diffraction grating wherein a reflective film is formed on the concave/convex portion in cross-section of the diffraction grating formed in one surface of the transparent substrate and an antireflective film is formed on the surface of the transparent substrate, which is opposite to the surface in which the concave/convex portion is formed, whereby it is adapted to receive light from the side of the antireflective film.

Further, there is provided the above-mentioned reflection type diffraction element wherein a protecting member composed of an inorganic material or an organic material is provided on the transparent substrate at the side of the reflective film so as to protect the reflective film.

Further, there is provided the above-mentioned reflection type diffraction element wherein the transparent substrate is a glass substrate, and the concave/convex portion is formed directly in a surface of the glass substrate or is formed in the inorganic material formed on the surface of the glass substrate.

Further, there is provided the above-mentioned reflection type diffraction element wherein the cross-sectioned shape of the concave/convex portion is a sawtooth-like shape or a shape in which a sawtooth-like shape is approximated by stairs.

BEST MODE FOR CARRYING OUT THE INVENTION

The diffraction element having concave/convex-like diffraction gratings in its two surfaces according to the present invention will first be explained. The present invention relates to a diffraction element having diffraction gratings in both surfaces of a transparent substrate wherein a surface of the transparent substrate is processed in a concave/convex-like shape in cross-section but the plane of it is a linear form or a curved form, and accordingly, the diffraction grating has a concave/convex portion. Further, the diffraction grating having a concave/convex portion may be formed by processing an inorganic film formed on a surface of the transparent substrate.

The diffraction element of the present invention is provided with an incoming-side diffraction grating in the central region of an incoming-side surface, into which an external light is incident, in the two surfaces, and at least one outgoing-side diffraction grating formed in an outgoing-side surface which is opposed to the incoming-side surface. These gratings are the diffraction gratings each having the concave/convex portion as described above.

Further, in the diffraction element of the present invention, the at least one outgoing-side diffraction grating is formed on the optical path of the external light diffracted by the incoming-side diffraction grating, and the grating pitch thereof is substantially equal to the grating pitch of the incoming-side diffraction grating.

Namely, the position of the outgoing-side diffraction grating is determined to be a position in the outgoing-side surface, at which the external light diffracted by the incoming-side diffraction grating reaches through the transparent substrate. Further depending on a purpose, two outgoing-side diffraction gratings may be provided on the optical paths along which diffracted external lights propagate. In this case, the grating pitch of the incoming-side diffraction grating is substantially equal to at least one of the two outgoing-side diffraction gratings. Here, "substantially equal" means that a difference between grating pitches of the incoming-side diffraction grating and the outgoing-side diffraction grating is 0.5° or less in terms of a difference of diffraction angle.

By constructing it as described above, the diffraction element of the present invention provides such effect that a change in a propagation direction of the diffracted light when there is a variation of the wavelength, is small.

Further, in the diffraction element of the present invention, when the at least one outgoing-side diffraction grating having the substantially equal grating pitch is a reflection type diffraction grating, a photodetector for detecting the diffracted light by the reflection type diffraction grating can be placed at the side of receiving an external light. With such arrangement, the system including an external light source, the diffraction gratings, the photodetector and so on can preferably be miniaturized.

Figure 3:
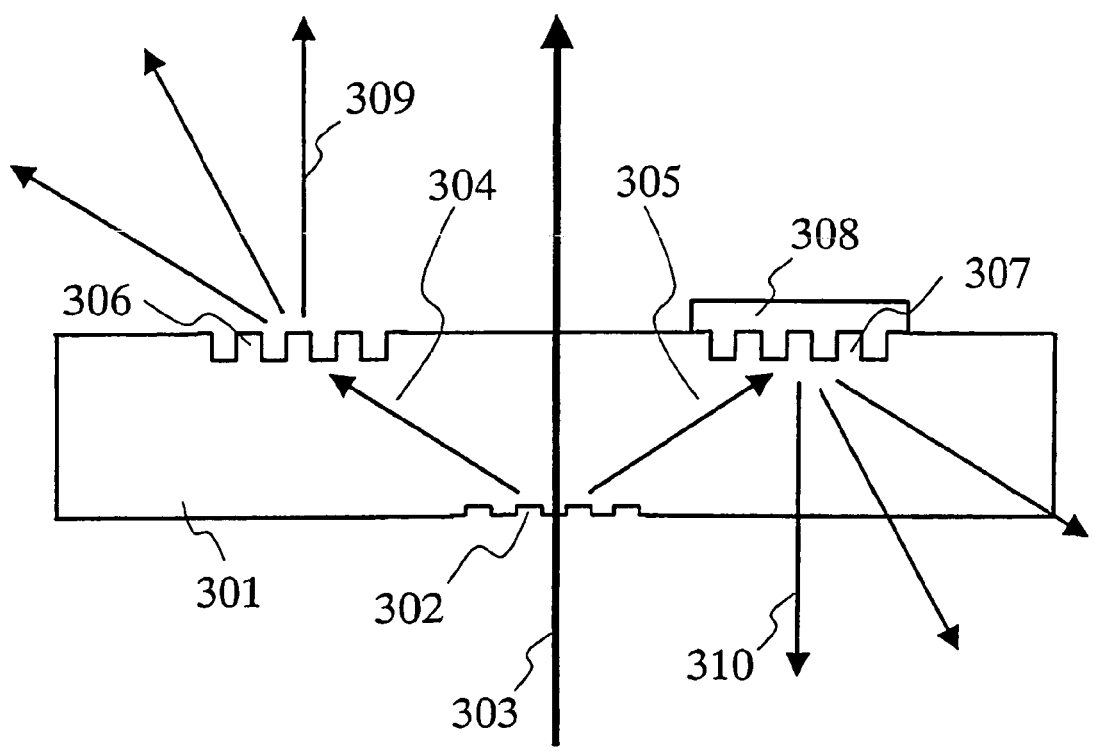
FIG. 3 is a schematic cross-sectional view showing an embodiment of the structure of the diffraction element according to the present invention.

In the following, an embodiment of the diffraction element of the present invention will be described with reference to the drawing. FIG. 3 shows an embodiment of the structure of the diffraction element of the present invention. An incoming-side diffraction grating 302 having rectangular concave/convex portions is formed by, for example, a photolithography method and a dry etching method in the central region of an incoming-side surface, into which an external light is incident, of a glass substrate as a transparent substrate 301. An incoming light 303 incident perpendicularly into the incoming-side surface is separated into three light beams: the incoming light 303 passing straight through the glass substrate, and a +1st order diffraction light 304 and a −1st order diffraction light 305 which are generated by the incoming-side diffraction grating 302.

The light quantity of each diffraction light can be distributed so that each diffraction light quantity is lessened or the almost quantity can be the diffraction light by adjusting the depth of the incoming-side diffraction grating 302 by processing. The incoming-side diffraction grating 302 may be formed in substantially the entire region excluding a peripheral region where the intensity of the light flux of the incoming light 303 is weak, or it may be formed only a part of such region. The intensity of the actual diffraction light is determined based on the diffraction efficiency of the diffraction grating and the surface area of the diffraction grating with respect to the cross-sectional area of the light flux.

The incoming light 303 passing through the diffraction element, after it has transmitted to the outgoing-side surface of the transparent substrate 301, is used as, for example, light beams for recording/reproducing information of an optical disk or light beams for optical communication. On the other hand, the +1st order diffraction light 304 and the −1st order diffraction light 305 generated by the incoming-side diffraction grating 302 propagate obliquely at an angle indicated by formula 1 in the transparent substrate 301 to reach the outgoing-side surface of the glass substrate. In formula 1, $\theta_3$ represents an angle of the propagating light in the transparent substrate, $\lambda$ represents the wavelength of the incoming light, $P_1$ represents the grating pitch of the incoming-side diffraction grating, n represents the refractive index of the transparent substrate in a case of $\lambda$, and m represents an order of diffraction.

On optical paths of the +1st order diffraction light 304 and the −1st order diffraction light 305 at the outgoing-side surface, a first outgoing-side diffraction grating 306 for the diffraction light 304 and a second outgoing-side diffraction grating 307 for the diffraction light 305 are formed respectively. Here, the grating pitch of the incoming-side diffraction grating 302 is equal to grating pitches of the first and second outgoing-side diffraction gratings 306, 307. The diffraction light 304 and the diffraction 305 are respectively diffracted to propagate into directions determined by formula 2 by means of the first and second outgoing-side diffraction gratings 306, 307 respectively. In formula 2, $\theta_4$ represents an angle of the propagating light in the transparent substrate, i represents an incident angle in the transparent substrate, $\lambda$ represents the wavelength of the incoming light, $P_2$ represents the grating pitch of the outgoing-side diffraction grating, n represents the refractive index of the transparent substrate in a case of $\lambda$, and m represents an order of diffraction.

$$\sin(\theta_3) = m \times \lambda/(P_1 \cdot n) \quad \text{Formula 1}$$

$$\sin(\theta_4) - \sin(i) = m \times \lambda/(P_2 \cdot n) \quad \text{Formula 2}$$

As shown in FIG. 3, either of two outgoing-side diffraction gratings, for example, the outgoing-side diffraction grating 306 may be a transmission type diffraction grating and the other, the outgoing-side diffraction grating 307, may be a reflection type diffraction grating formed by coating a reflective film 308. On the contrary, the outgoing-side diffraction grating 306 may be a reflection type diffraction grating.

Each light diffracted by the outgoing-side diffraction grating 306 or 307 is introduced into each photodetector or the like. When the wavelength of the incoming light 303 varies, angles $\theta_3$, $\theta_4$ of propagating light are changed, as shown in Formulae 1 and 2, so that directions of propagation of the diffraction lights are changed. In case that a measuring device such as a photodetector having an incident angle dependence is used or that the distance between a measuring device and the diffraction element is large even though the photodetector does not have an incident angle dependence, measurement error may be caused due to wavelength variation, or the position of the incoming light to the detecting portion of the measuring device may change, depending on the wavelength dependence of the propagation direction (angle).

When the grating pitch of the incoming-side diffraction grating is made equal to the grating pitch of the outgoing-side diffraction grating, the −1st order diffraction light 309 generated by the outgoing-side diffraction grating 306 is used for the diffraction light 304 generated by the incoming-side diffraction grating 302, and the +1st order diffraction light 310 generated by the outgoing-side diffraction grating 307 is used for the diffraction light 305 generated by the incoming-side diffraction grating 302, whereby changes in propagation direction caused by a change of the wavelength of the incoming light can be canceled.

Depending on measuring devices used, the grating pitch of both the outgoing-side diffraction grating 306 and outgoing-side diffraction grating 307 may be in conformity with the grating pitch of the incoming-side diffraction grating 302 or the grating pitch of either necessary one may be in conformity with it. When the grating pitches are made equal to cancel the wavelength dependence in propagation direction of incoming light beams, the −1st order diffraction light 309 generated by the outgoing-side diffraction grating 306 and the +1st order diffraction light 310 by the outgoing-side diffraction grating 307 are necessarily used, and a diffraction light having an order other than the above-mentioned can not be used because it has wavelength dependence in the propagation direction.

In this case, it is preferable to use, as the outgoing-side diffraction grating having substantially equal grating pitch, a sawtooth-like diffraction grating or a pseudo sawtooth-like diffraction grating whose shape is approximated by stairs, each of which exhibits a high diffraction efficiency with respect to a diffraction light having a specified order of diffraction, because utilization efficiency of light for a system for recording/reproducing light or optical communication can be increased. As the pseudo sawtooth-like shape, a continuous inclined plane of a sawtooth can be approximated by a plurality of steps like stairs. This pseudo sawtooth-like diffraction grating matches well manufacturing processes such as a photolithography method and a dry etching method. Here, the number of steps is determined depending on conditions of using the diffraction element. Usually, two steps to 31 steps are used.

In addition to the structure of the above-mentioned diffraction gratings, such structure may be adopted wherein the outgoing-side diffraction gratings 306, 307 are formed in the incoming-side surface and a reflective film is formed at portions corresponding to grating planes of the outgoing-side diffraction gratings into which the diffraction light 304 and the diffraction light 305 generated by the incoming-side diffraction grating 302 incident so that the light beams are diffractively returned.

The sawtooth-like or the pseudo sawtooth-like diffraction grating can be used for the incoming-side diffraction grating 302. In this case, it is possible to assign the intensity of each diffraction light diffracted to each of the two measuring devices. Accordingly, it is possible to make the light beams incident into a measuring device requiring a larger light intensity with a larger distribution ratio without reducing largely the whole utilization efficiency of light.

In order to diffract light of a specified order of diffraction at the pseudo sawtooth-like diffraction grating, it has been known that it is the best to divide the depth of the grating and the length in the periodical direction of the grating to be an equal division so that a high diffraction efficiency can be obtained. On the other hand, in order to increase the intensity of a 0 order diffraction light (a transmission light) to the maximum and to distribute a part of the incoming light by diffraction, it is not always necessary to divide the depth of the grating and the length in the periodical direction of the grating to be an equal division. Accordingly, the division of the depth of the grating and the length in the periodical direction of the grating can freely be determined in order to obtain a desired distribution ratio on the light quantity of diffraction light having a required order of diffraction.

For example, when the diffraction efficiency of the incoming-side diffraction grating 302 in FIG. 3 is determined to be low so that the most part of the incoming light to the element is utilized by passing it therethrough, a larger distribution ratio than that of the equally divided pseudo sawtooth-like diffraction grating is obtainable by adjusting the division of the incoming-side diffraction grating 302.

Figure 5A:
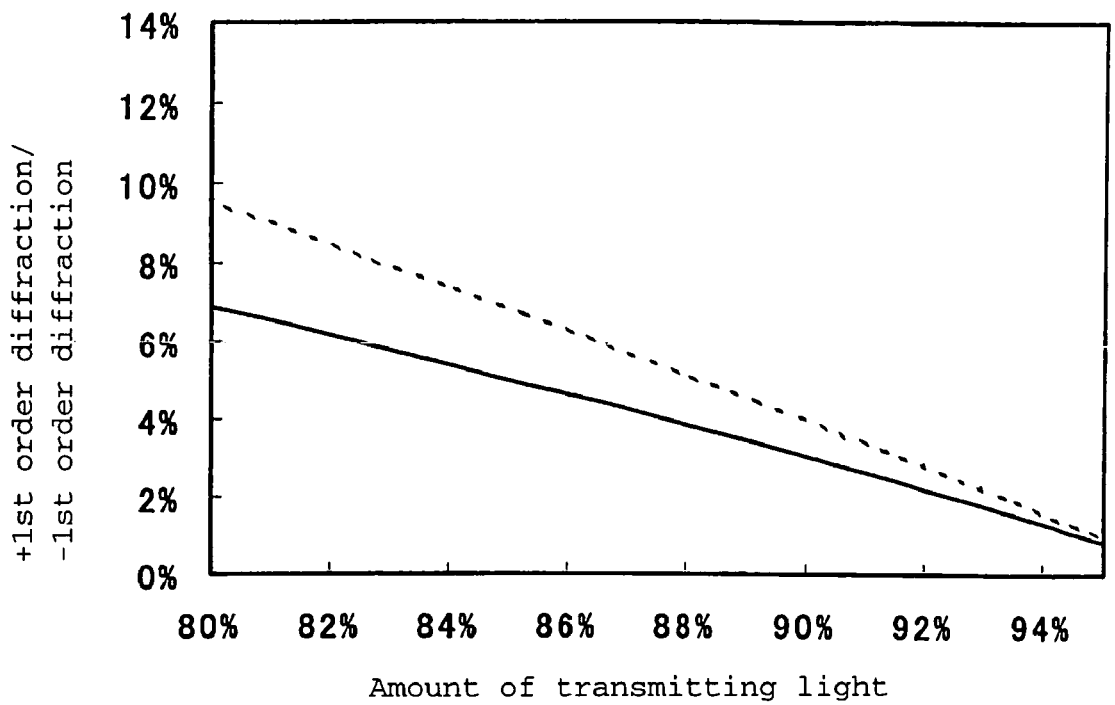
FIG. 5 are graphs showing examples of the diffraction characteristics of a differently divided grating pitch of the diffraction element of the present invention wherein (a) shows a case that the grating pitch is divided to be equal and (b) is a case that the divided portion of the grating pitch is modified.
Figure 5B:
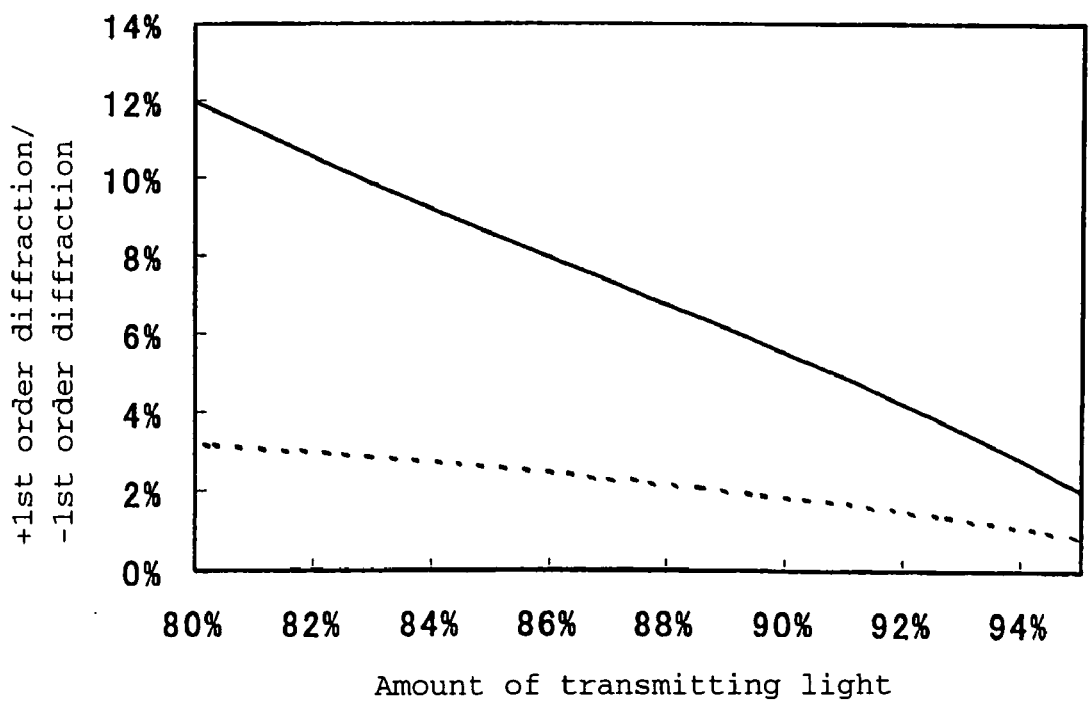
Figure 6:
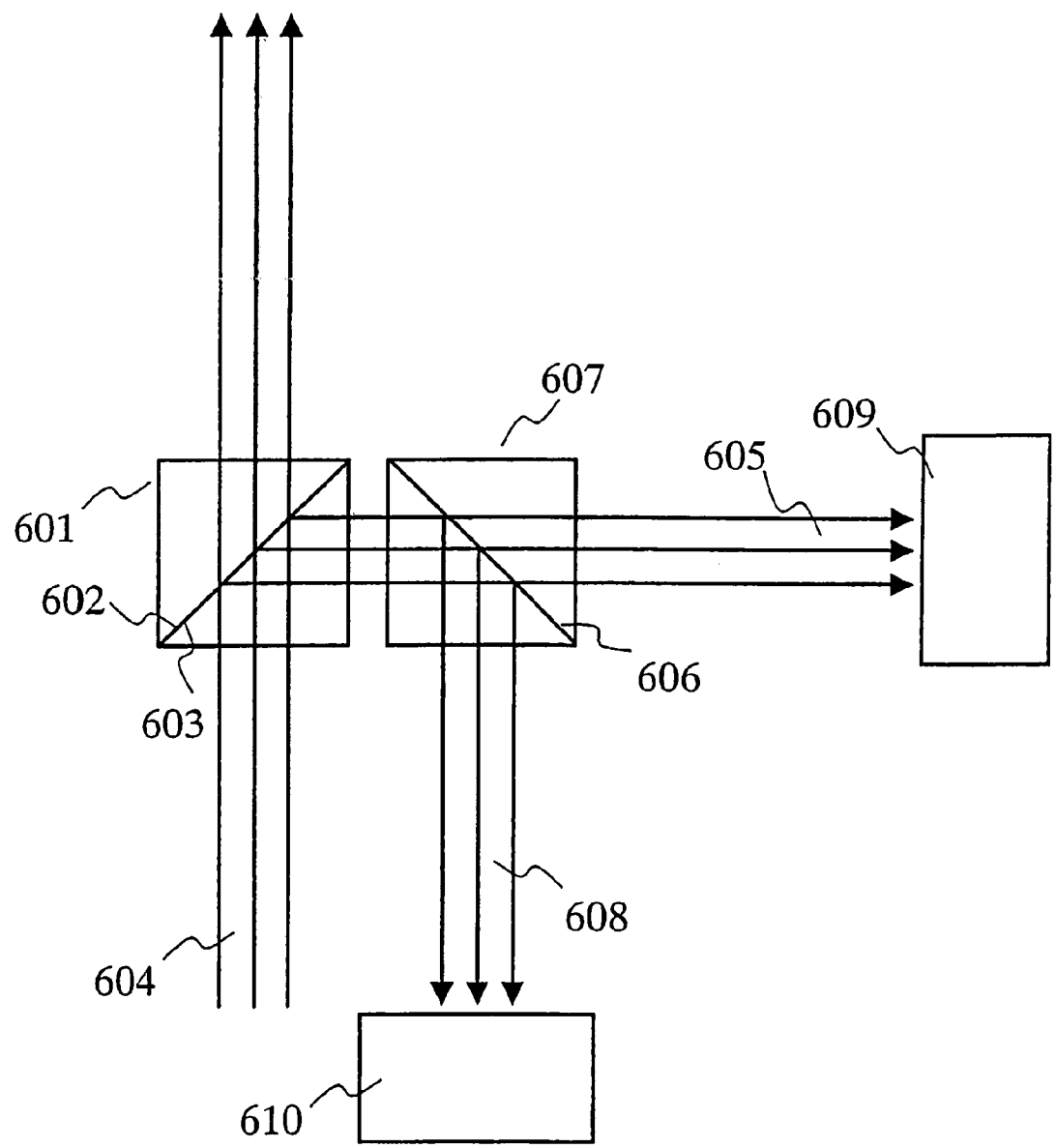
FIG. 6 is a schematic view showing an embodiment of separating light by using a conventional corner-cube prism.

FIG. 5 shows the relation between the diffraction efficiency and the transmittance of each of the +1st order diffraction light and the −1st order diffraction light with respect to the polarization in parallel to a longitudinal direction of the grating under conditions of a wavelength of 1550 nm and a grating pitch of 1.6 µm, as an example. FIG. 5(a) shows a case that the division of the depth of the grating and the length in the periodical direction of the grating is made equal, and FIG. 5(b) shows a case that the division of the length in the periodical direction of the grating is adjusted to be 1:3:1.

From the graphs of FIGS. 5(a) and 5(b), it is understood that the diffraction efficiency of the −1st order diffraction light indicated by a solid line can be increased to be higher than the diffraction efficiency of the +1st order diffraction light indicated by a broken line with respect to the same value of transmittance. Accordingly, it is possible to distribute a required light quantity to a measuring device requiring a necessary light quantity without reducing the transmittance. Thus, by adjusting the division of the depth of the grating and the length in the periodical direction of the grating, diffraction efficiencies of the +1st order diffraction light and the −1st order diffraction light can be changed together. The degree of change is greater as the grating pitch approaches the wavelength.

Figure 4:
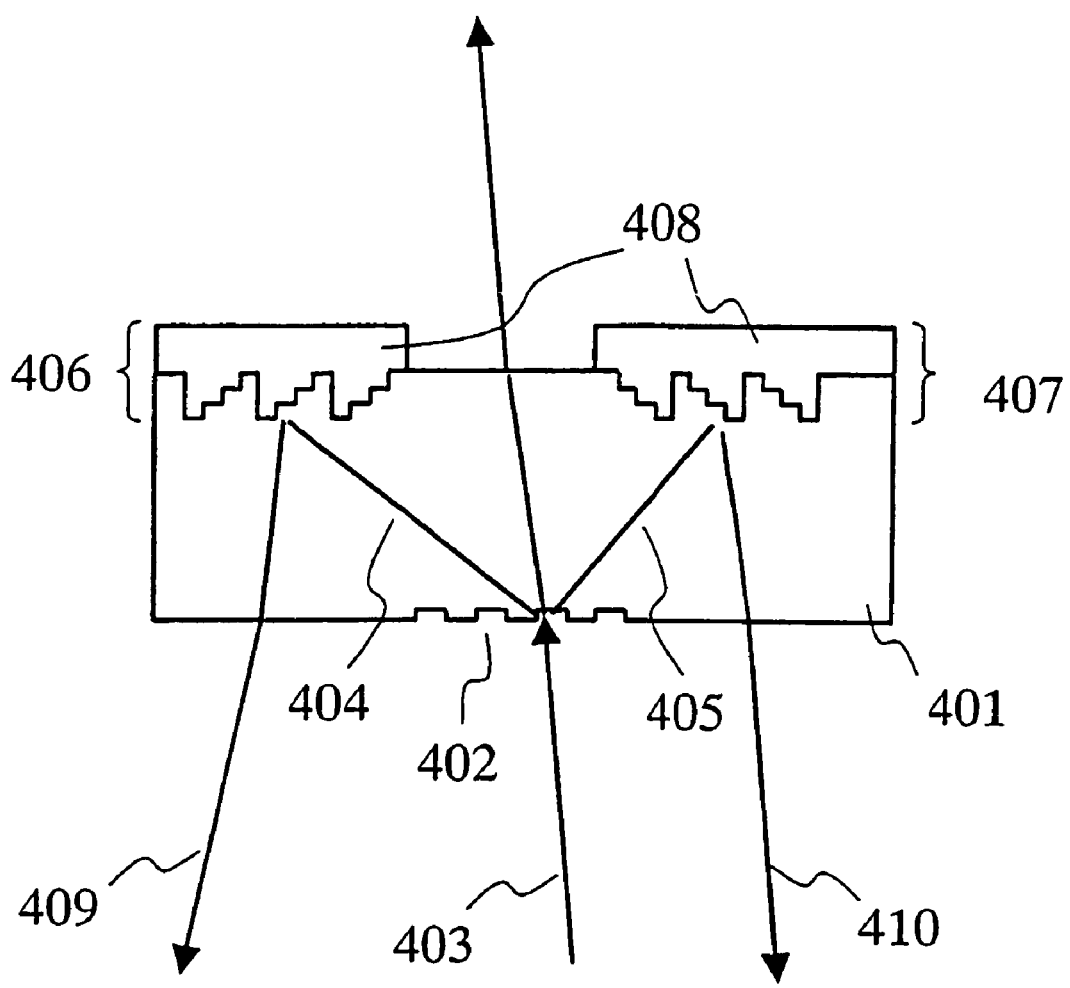
FIG. 4 is a schematic cross-sectional view showing another embodiment of the structure of the diffraction element according to the present invention.

FIG. 4 is a cross-sectional view showing another embodiment of the structure of the diffraction element of the present invention. In order to control the direction of diffraction light beams separated by the diffraction, the light beams may be introduced obliquely in the above-mentioned embodiment shown in FIG. 3. The other embodiment shown in FIG. 4 has such a structure that two diffraction lights diffracted and separated by the incoming-side diffraction grating are returned toward the incoming-side by being diffracted by outgoing-side diffraction gratings. An incoming light 403 incident obliquely to an incoming-side diffraction grating 402 formed in an incoming-side surface of a transparent substrate 401 is diffracted to be a +1st order diffraction light 404 and a −1st order diffraction light 405. The generated diffraction light 404 and diffraction light 405 are diffracted reflectively at outgoing-side diffraction gratings 406, 407 with reflective films 408, which are formed on an outgoing-side surface, to be emitted as returning lights 409, 410 through the incoming-side surface.

In a case that the incoming light 403 is inclined toward the −1st order diffraction light 405 as shown in FIG. 4, and the grating pitch of the incoming-side diffraction grating 402 is equal to the grating pitch of the outgoing-side diffraction grating 406, the direction of the returning light 409 has a reverse inclination with respect to the direction of the incoming light, and the angle of the returning light to the normal line extending from the diffraction element is twice as large as the incident angle. Accordingly, the returning light 409 does not cross the incoming light 403 and it is separated at an angle three times larger than the incident angle. This angular relation is maintained even if the wavelength of the incoming light varies.

On the other hand, when the grating pitch of the outgoing-side diffraction grating 407 to which the diffraction light 405 is incident, is determined appropriately to be wider than the grating pitch of the incoming-side diffraction grating 402, the returning light 410 can be emitted from the element in substantially parallel without crossing the incoming light 403.

By using this method, the propagation direction of light beams can freely be determined even when a measuring device having an incident angle dependence is used. By changing the grating pitch of the diffraction grating, the direction of diffraction can be changed. However, a high diffraction efficiency can not be obtained in a region that the grating pitch is closer to the wavelength, and actual work for preparing the grating becomes difficult. Accordingly, the way of controlling the propagation direction of light beams by introducing light with an oblique angle becomes effective as described above.

Namely, in the diffraction element, it is preferred to determine the grating pitch of the outgoing-side diffraction grating or the incoming-side diffraction grating so that the angle between the direction of an incoming light and the direction of either one of the +1st order diffraction light or the −1st order diffraction light generated by the incoming-side diffraction grating, becomes larger in a direction from the incoming-side surface toward the propagation direction when an external light is introduced obliquely to the surface of the incoming-side diffraction grating formed in the incoming-side surface of the diffraction element.

The sawtooth-like or pseudo sawtooth-like diffraction grating can be used as the incoming-side diffraction grating 402. In such case, the distribution ratio of the light quantity to each of the two measuring devices can be changed, and light can be introduced to a measuring device requiring a larger intensity with a larger distribution ratio of the intensity without reducing largely the whole utilization efficiency of light. In the same manner as the first embodiment, when the diffraction efficiency of the incoming-side diffraction grating 402 is determined to be low to utilize the most part of the incoming light to the element by passing it therethrough, it is possible to make the distribution ratio larger than that of the equally divided pseudo sawtooth-like diffraction grating by adjusting the division of the incoming-side diffraction grating 402.

By using the structure of the present invention, light beams can be separated and propagated with a higher degree of freedom by a small-sized diffraction element excellent in mass production and reliability, and the reduction of the wavelength dependence in a propagation direction and the degree of freedom of directions of separating light beams can be satisfied at the same time as the case requires. A spectroscopic system excellent in reliability and mass production can be realized by using the diffraction element having the wavelength dependence in the diffraction direction in principle.

The grating pattern of the diffraction element of the present invention is prepared by using, for example, a photomask. Accordingly, not only a linear shape but also a shape along a curved line can be formed. Thus, in designing a radius of curvature for the grating pattern, it is possible to add function as a lens so that a diffraction light can be collected on a photodetector. Further, by using a process for a wafer having a large surface area, a layer having function as a phase plate can be laminated whereby a diffraction element of high performance/composite type can be produced.

The diffraction grating formed in the diffraction element of the present invention may be formed in the transparent substrate itself and/or a film formed on the transparent substrate. It is preferable from viewpoints of reliability and a large scale production to process directly the transparent substrate excellent in being etched because cost for forming the film does not occur and there is no needless interface. As material for the transparent substrate, quartz glass exhibiting a high transparency in a broader wavelength region covering ultraviolet light, visible light and infrared light can be mentioned as an example. However, when the usable wavelength is only in an infrared region, a silicone substrate or the like exhibiting a high transparency in the infrared region although it is not transparent in a visible light region can be used. In order to control further the change of the direction of separation/propagation in response to a change of operating environmental temperature, a diffraction grating formed in a transparent substrate having a low expansion coefficient by processing the transparent substrate directly or a film formed on the transparent substrate, is preferably used.

When a diffraction grating formed in the diffraction element is used as a reflection type diffraction grating, a reflective interface is formed at the diffraction grating. In this case, a dielectric multilayer film or a metal film composed of a reflective interface material may be formed, in particular, the metal film is more preferably used because it provides a high reflection efficiency with a thinner film thickness. In order to form a film of fine structure, it is preferable to use a sputtering method or a RF vacuum deposition method providing an excellent wrapping performance to the reflective interface material at the time of the formation of a film. Further, a wet process such as a plating method may be used.

The present invention provides a better effect in using a narrow-pitched diffraction grating by which an amount of separation of a diffraction light is increased by increasing the diffraction angle. In particular, a larger effect is obtainable by a diffraction grating in which the grating pitch is about two times or less of the center-wavelength.

Next, description will be made as to the reflection type diffraction element of the present invention wherein a light reflective film is formed on a concave/convex portion of the diffraction grating having a concave/convex-like shape in cross-section which is formed in a surface of a transparent substrate. Further, an antireflective film is formed on the opposite surface of the transparent substrate, in which the concave/convex portion is formed whereby the reflection type diffraction element is adapted to receive light incident from the side of the antireflective film.

By constructing the reflection type diffraction element, the change of the diffraction efficiency due to the wavelength dependence can be suppressed, and an irregular polarization direction can also be suppressed. The concave/convex portion may have a rectangular shape, a sawtooth-like shape or a pseudo sawtooth-like shape. Although the effect expected for the present invention can be achieved by using any type of these shapes, use of the sawtooth-like shape or a pseudo sawtooth-like shape can provide a higher diffraction efficiency of a diffraction light in a wider range of the wavelength and the angle of the incoming light or a wider range of the grating pitch.

In the following, description will be made by taking the sawtooth-like shape or the pseudo sawtooth-like shape as an example with reference to the drawing.

Figure 8:
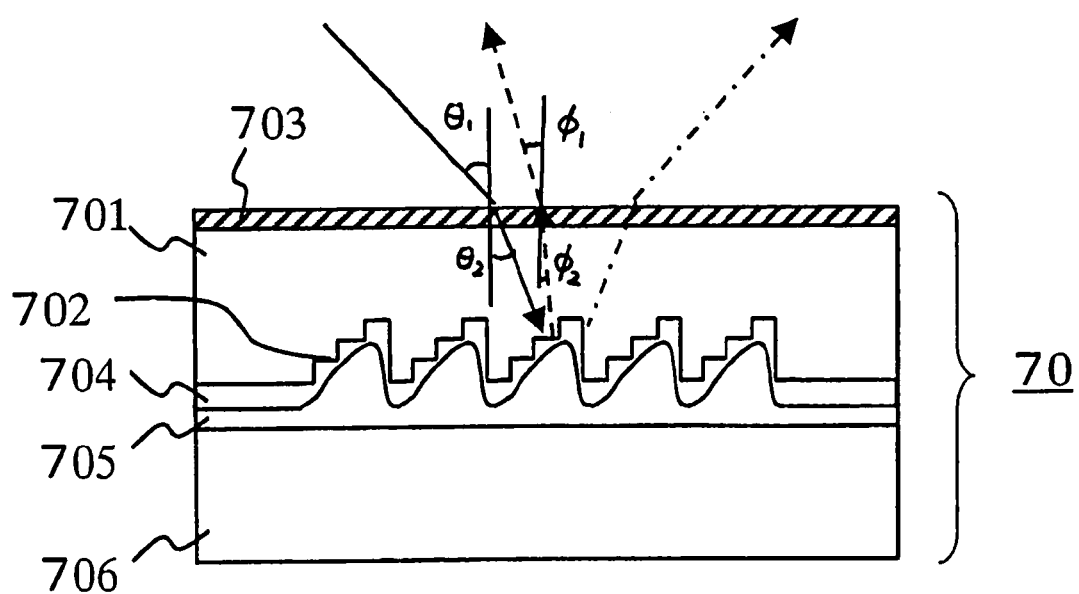
FIG. 8 is a side view showing an embodiment of the structure of the reflection type diffraction element according to the present invention.

FIG. 8 is a side view showing an embodiment of the structure of the reflection type diffraction element according to the present invention. A low-reflective film 703 as an antireflective film is coated on a transparent substrate 701 so that this film constitutes a light receiving plane. In a rear surface of the transparent substrate 701 without having any low-reflective film 703, a pseudo sawtooth-like diffraction grating 702 having a grating pitch P whose sawtooth-like concave/convex portion is approximated by a stair-like shape of four levels (three steps), is formed by repeating photographic and dry etching processes. On this pseudo sawtooth-like diffraction grating, a high-reflective layer 704 as a reflective film made of metal is formed.

Further, a protecting substrate 706 is bonded onto the high-reflective layer 704 by means of an adhesive layer 705 to protect the high-reflective layer 704. Thus, a reflection type diffraction element 70 is constituted. When light having a wavelength λ is incident into the low-reflective film 703 of the reflection type diffraction element 70 with an external incident angle $\theta_1$ with respect to the normal line, the light is diffracted by the transparent substrate 701 having a refractive index n and propagates in the transparent substrate 701 with an internal incident angle $\theta_2$ according to Snell's law, $\sin(\theta_2)=\sin(\theta_1)/n$.

The propagating light is incident into the pseudo sawtooth-like diffraction grating 702 with an internal incident angle $\theta_2$ whereby the almost amount of the propagating light is concentrated and diffracted reflectively as diffraction light having a sign, i.e., diffraction light having a +sign or a –sign with a specified diffraction order, which is determined by the shape of the grating. In a case that the diffraction light is concentrated to the light having a –1st order, it propagates in the transparent substrate 701 with a diffraction angle $\Phi_2$ with respect to the normal line, determined by the following formulae, and is diffracted at the interface between the low-reflective film 703 and air so as to propagate in the air with a diffraction angle $\Phi_1$ toward a detector (not shown). Here, a solid arrow mark indicates an incoming light, a one-dotted chain line indicates the reflected light and a broken line indicates a 1st order diffraction light, respectively.

$\sin(\Phi_2)-\sin(\theta_2)=\lambda/P$  Formula 3

$\sin(\Phi_1)=\sin(\Phi_2)\times n$  Formula 4

Here, $\Phi_1$ is the same as the diffraction direction of the reflection type diffraction element having a diffraction grating on a surface of the transparent substrate in consequence.

Figure 9:
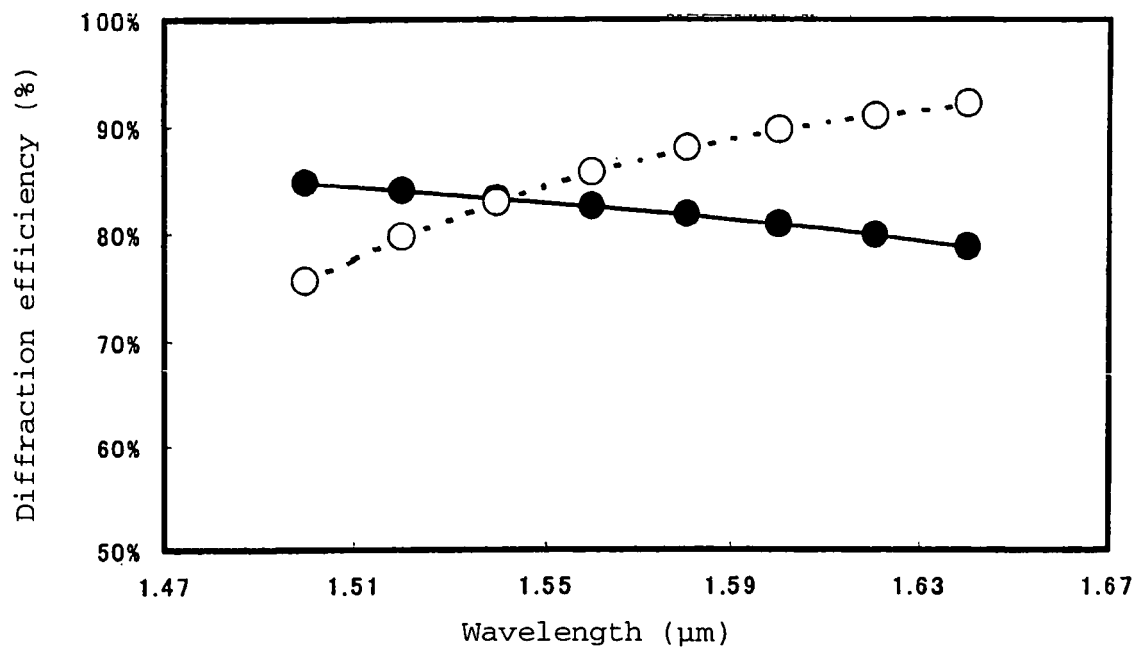
FIG. 9 is a graph showing an example of the diffraction characteristics of the reflection type diffraction element according to the present invention.
Figure 10:
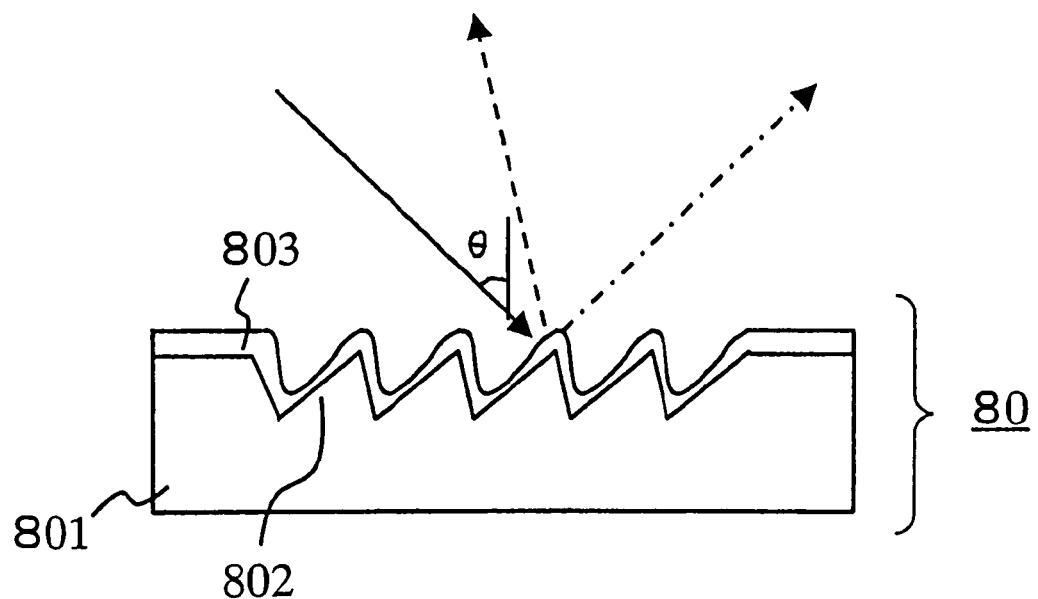
FIG. 10 is a side view showing the structure of a conventional reflection type diffraction element.
Figure 11:
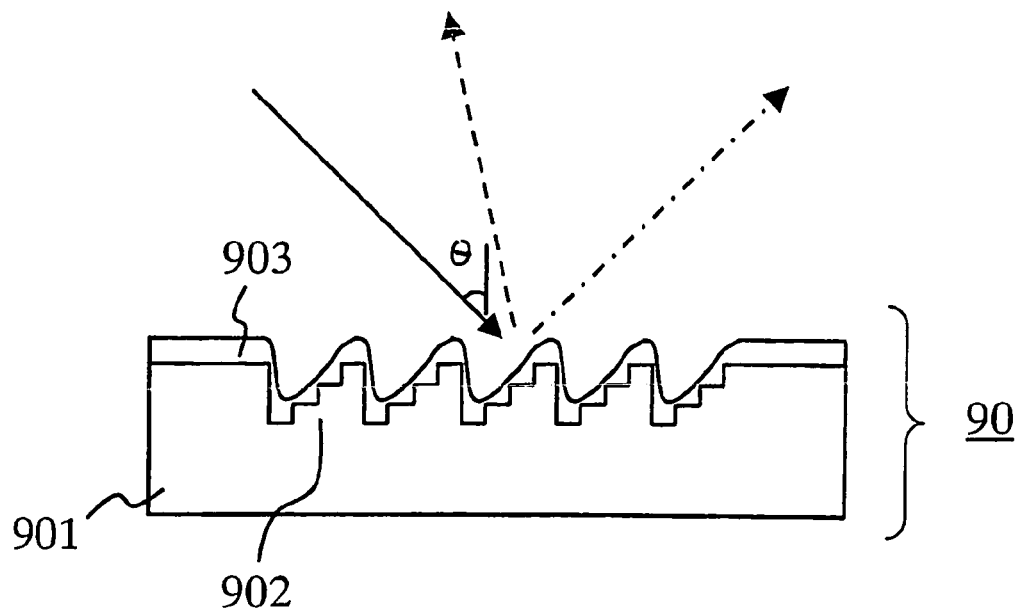
FIG. 11 is a side view showing the structure of another conventional reflection type diffraction element.
Figure 12:
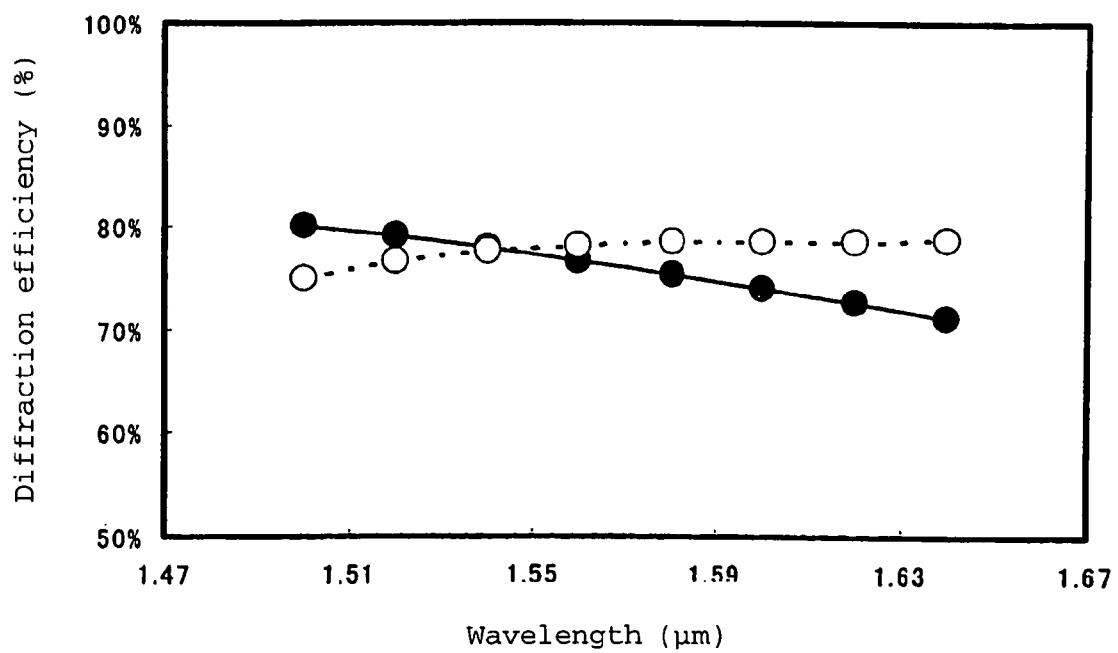
FIG. 12 is a graph showing an example of the diffraction characteristics of a conventional reflection type diffraction element.
Figure 13:
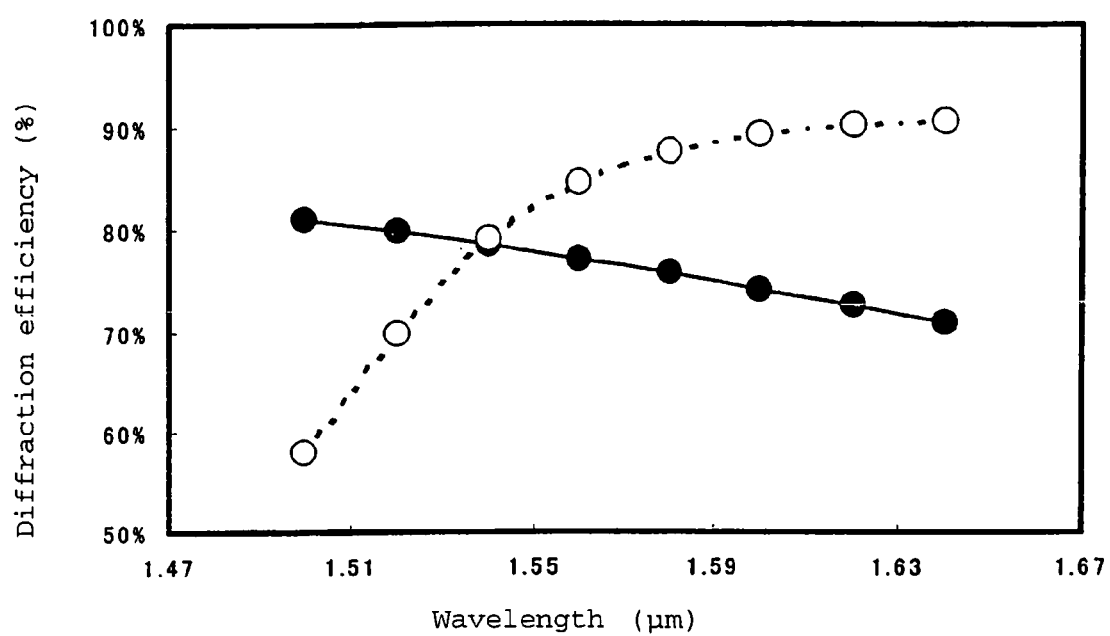
FIG. 13 is a graph showing another example of the diffraction characteristics of a conventional reflection type diffraction element.

FIG. 9 shows wavelength dependences on the diffraction efficiency depending on directions of different polarization under conditions that a pseudo sawtooth-like diffraction grating comprising about 600 gratings per mm is formed in a rear plane (a plane without having the low-reflective film) of a quartz glass substrate having a refractive index of 1.44 and an external incident angle θ is 40°. Here, outlined circles indicate an S-polarized light and black circles indicate a P-polarized light. It is understood that the wavelength dependences on the diffraction efficiency depending on the difference of directions of polarization can be improved in FIG. 9 in comparison with the reflection type diffraction element having the pseudo sawtooth-like diffraction grating under the condition of the same incident angle, as shown in FIG. 13.

In the structure of the present invention, even when light is introduced into the reflection type diffraction element with a larger external incident angle, it can be directed to the pseudo sawtooth-like diffraction grating with a smaller internal incident angle in the transparent substrate, with the result that wavelength dependences on the directions of polarization can be reduced. With this structure, the reflection type diffraction element excellent in reliability and mass production can be realized, and a more inexpensive spectroscopic system can be realized. Since it is particularly unnecessary to determine a smaller external incident angle in the reflection type diffraction element in order to assure the diffraction efficiency without relying largely on the direction of polarization and the change of the wavelength of an incident light, a larger degree of freedom can be presented for designing the spectroscopic system.

The pattern of diffraction grating, in a plane view, of the reflection type diffraction element of the present invention can be prepared by using a photomask or the like. Accordingly, such diffraction grating pattern is not limited to a linear shape but can be, for example, a curved shape. Such curved shape allows to add function as a lens so that the diffraction light can be collected onto a detector. Further, by using a process for a wafer having large surface area, it is possible to laminate an optical layer having another function such as a phase plate on the reflection type diffraction element. In this case, it can be of a high performance and a complex system.

The diffraction grating of the present invention is preferably prepared by processing a glass substrate itself or an inorganic material formed on the glass substrate. It is particularly preferable to process directly a quartz glass substrate having high speed and uniform etching characteristics in the points that cost for film formation does not occur and the interface between the film and the substrate does not exist. Further, it is also preferable from viewpoints of reliability and a large scale production. Further, when an inorganic material having an excellent etching property is formed as a film on a quartz glass substrate having a smaller thermal expansion coefficient than the organic material, there is such effect that a change of the diffraction direction due to a temperature change can be controlled. Such structure is preferred to obtain the element having excellent temperature characteristics.

In the high-reflective film, there is no limitation as to its thickness because only the interface of the film to the sawtooth-like diffraction grating functions optically. Accordingly, it is unnecessary to consider the deterioration (deformation) of the shape of the high-reflective film even if it has a large thickness, and accordingly, it may be formed to have a sufficient film thickness. In this case also, a sufficient reflectivity can be assured. Further, it is unnecessary to form it to be thin with high accuracy, use of a vacuum film-forming method such as a vacuum deposition method, a sputtering method or the like is not always necessary but a plating method or the like may be used.

The protecting means for protecting the high-reflective film formed on the rear surface of the reflection type diffraction element does not function optically. Accordingly, the protecting means is unnecessarily to be transparent and there is no limitation on thickness. It is preferable that a protecting means composed of an inorganic material or an organic material is provided at the side of the high-reflective film. Although an organic material such as a resin or an inorganic material allowing a vacuum film-forming method can widely be employed, a resinous material which can be coated and cured is particularly preferably used.

When the reflection type diffraction element is mounted on a specified apparatus wherein, for example, the rear surface of the reflection type diffraction element is required to have accuracy in order to use the rear surface as standard at the time of mounting, or a stronger protection is required, it is preferable to bond a flat and stronger transparent substrate by using an adhesive coated on the high-reflective film.

In this case, a glass substrate, a silicone substrate or the like can be used. However, it is preferable to use a material having substantially the same thermal expansion coefficient as the transparent substrate in order to suppress a change in the characteristics caused during a high temperature condition, resulted due to difference in the expansion coefficient. In the present invention, a remarkable effect is obtainable when a diffraction grating having a narrow pitch, which improves the wavelength dissolving power by increasing especially the diffraction angle, is used. In particular, use of such diffraction grating that the grating pitch is substantially equal to the center-wavelength of light or that the grating pitch is smaller than the center-wavelength of light, provides a large effect.

In the following, some examples will be described.

EXAMPLE 1

Figure 1:
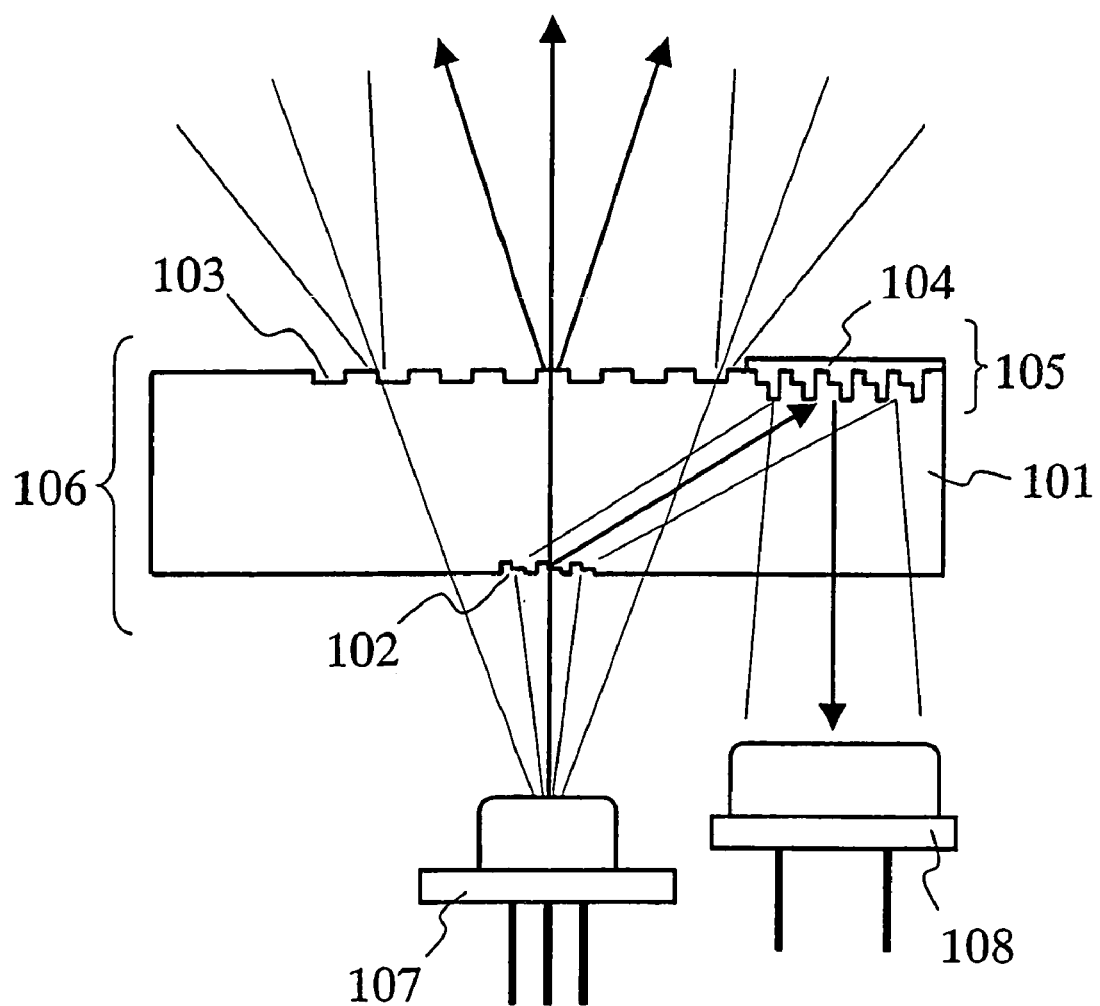
FIG. 1 is a cross-sectional view showing the structure of the diffraction element according to Example 1.

FIG. 1 is a cross-sectional view showing the structure of the diffraction element of this example. In this Example, a quartz glass substrate having a thickness of 2.0 mm was used as a transparent substrate 101, and a pseudo sawtooth-like diffraction grating (a transmission type) having a grating pitch of 1.15 μm and three levels (two steps), wherein each height (depth) was 0.15 μm and 0.30 μm, was formed in a central region having a diameter of 0.5 mm Φ in its incoming-side surface by repeating a photolithography method and a dry etching method. Thus, an incoming-side diffraction grating 102 was formed.

Then, in an outgoing-side surface as the opposite side in the quartz glass substrate, a three-beam generating diffraction grating 103 for detecting a tracking signal, having a grating pitch of 20 μm and a depth of 0.2 μm was formed as an outgoing-side diffraction grating. Further, a pseudo sawtooth-like diffraction grating (a reflection type) having a grating pitch of 1.15 μm, which was equal to the grating pitch of the incoming-side diffraction grating 102, and three levels (two steps), wherein each height (depth) was 0.1 μm and 0.2 μm, by processing an outer peripheral region of the three-beam generating diffraction grating 103 and by coating a reflective film 104 of gold having a film thickness of 200 nm selectively only on the grating portion by a sputtering method and a photolithographic method, whereby a reflective diffraction grating 105 was provided as another outgoing-side diffraction grating. Finally, low-reflective coating layers (not shown) were formed on both surfaces of the quartz glass substrate to obtain a diffraction element 106.

In the following, description will be made as to an optical head device in which this diffraction element 106 is assembled. When light having an oscillation wavelength of 660 nm emitted from a semiconductor laser 107 was incident into the diffraction grating, only the center portion of the light which had a stronger intensity at the incoming-side surface of the diffraction element was passed through the incoming-side diffraction grating 102, and the other part of light was diffracted. The center portion of the light without being diffracted and light propagating through the region other than the incoming-side diffraction grating 102 and propagating rectilinearly, were respectively diffracted and separated into three directions at the three-beam generating diffraction grating 103 to be introduced into an optical disk by means of a collimator lens or an objective lens (not shown). On the other hand, the light diffracted by the incoming-side diffraction grating 102 was directed to the reflective diffraction grating 105, and the reflecting diffraction light emanated through the diffraction element 106 to be detected by a receptor 108.

In this Example, about 85% of the light emitted from the semiconductor laser 107 reached the three-beam generating diffraction grating and was introduced into the optical disk. On the other hand, 5% of the light was detected by the receptor 108 through the incoming-side diffraction grating 102 and the reflective diffraction grating 105. In this detected light, no substantial change of signal level to the receptor was observed even in consideration of the difference of the inherency of the oscillation wavelength of the used semiconductor laser 107.

Further, the signal level was stable even in a change of the wavelength due to a temperature change of the semiconductor laser 107. In addition, since there was no change of the light receiving position due to a change of the incident angle derived from a wavelength variation, the adjusting unit for the receptor could be omitted. By adjusting the oscillation intensity of the semiconductor laser 107 by using the signal light to the receptor, it was possible to record information into and reproduce it from the optical disk stably.

EXAMPLE 2

Figure 2:
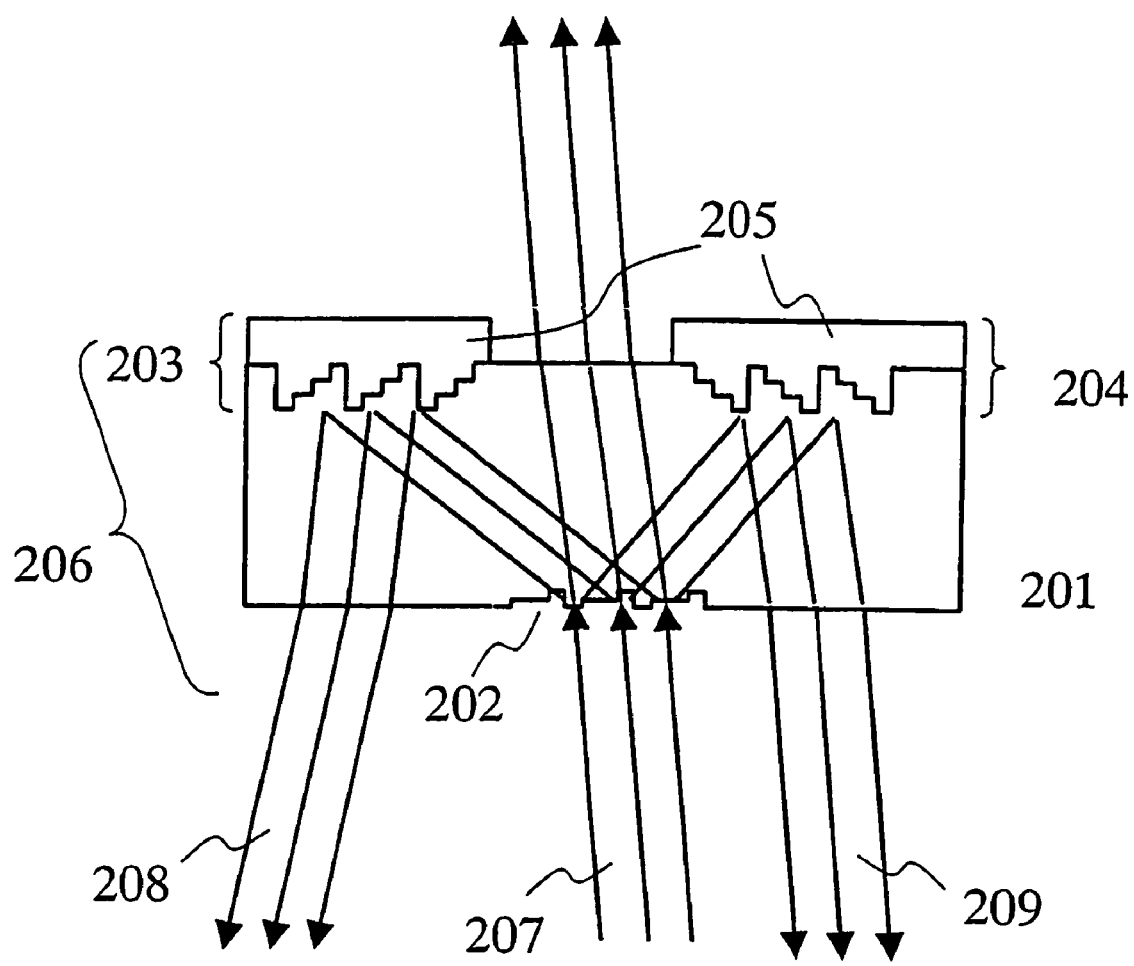
FIG. 2 is a cross-sectional view showing the structure of the diffraction element according to Example 2.

FIG. 2 is a cross-sectional view showing the structure of the diffraction element of this example. In this Example, a quartz glass substrate having a thickness of 2.0 mm was used as a transparent substrate 201. By repeating a photolithography method and a dry etching method to the central region having a diameter of 1.0 mmΦ of an incoming-side surface of the substrate, a pseudo sawtooth-like diffraction grating (a transmission type) having three levels (two steps) wherein each height (depth) was 0.60 μm, 0.30 μm and 0.0 μm, and the region of grating pitch was 1.8 μm, which was divided into three sub-regions of 0.36 μm, 1.08 μm and 0.36 μm, was formed. Thus an incoming-side diffraction grating 202 was formed.

In two regions in the opposite outgoing-side surface of the quartz glass substrate at which the light diffracted by the incoming-side diffraction grating 202 reached, a reflective diffraction grating 203 as an outgoing-side diffraction grating having a grating pitch of 1.8 μm and a reflective diffraction grating 204 as another outgoing-side diffraction grating having a grating pitch of 2.0 µm were formed by repeating a photolithography method and a dry etching method. In the reflective diffraction gratings 203 and 204, each of the grating pitches was divided into four portions and these grating pitch portions were processed to form steps each having a height (depth) of 0.15 µm to provide pseudo sawtooth-like diffraction gratings having four levels. Then, a reflective film 205 having a film thickness of 200 µm was coated selectively only on each grating portion by sputtering gold by using a lift-off method to thereby form pseudo sawtooth-like diffraction gratings (reflection type) of four levels (three steps). Finally, antireflective coating films (not shown) were coated on both surfaces of the quartz glass substrate. Thus a diffraction element 206 was prepared.

When a collimated incoming light 207 of a wavelength of 1550 nm having a polarization perpendicular to a longitudinal direction of the diffraction grating was incident into the diffraction element 206 at an incident angle of 5° with respect to the normal line of the diffraction grating, the incoming light 207 was separated into three portions at the incoming-side diffraction grating 202. In this construction, about 92% of the incoming light 202 transmitted through the diffraction grating 206. With respect to a +1st order diffraction light (at a left side in the figure), about 3% of the incoming light quantity was diffracted to be directed into the reflective diffraction grating 203 having the same grating pitch as the incoming-side diffraction grating 202, at which the almost amount of light was diffracted so that the diffracted light emanated from the diffraction element 206. The angle of emanation of the light at this moment was about double, with a reverse inclination, of the incident angle of the incoming light 207. The light emanated finally from the diffraction grating 206 was a returning light 208 having an intensity of 2.4% of the incoming light 207.

With respect to a −1st order diffraction light (a right side of the figure), about 1% of the incoming light quantity was diffracted to be directed into the reflective diffraction grating 203 having a larger grating pitch than the incoming-side diffraction grating 204 at which the almost amount of the light was diffracted and emanated from the diffraction element 206. The direction of the emanated light at this moment was substantially parallel to the incoming light 207. The light emanated finally from the diffraction grating 206 was a returning light 209 having an intensity of 0.7% of the incoming light 207.

The returning light 208 was introduced into a double slit type spectro-diffraction element (not shown) to measure the wavelength. In the measurement, the flux of the incoming light should have a high parallelism. In this case, however, the measurement of the wavelength could be achieved because a sufficient degree of parallelism was maintained even when a wavelength variation took place in the incoming light. The returning light 209 was collected onto the receptor (not shown) to measure the intensity. The measurement of the intensity could be achieved because the returning light was stably incident even though there was a wavelength variation.

In this Example, the light was separated by using an extremely small diffraction element, and the almost amount of the incoming light 207 could be utilized without causing a substantial reduction in the intensity while the wavelength and the intensity of the light could be measured correctly and simultaneously.

EXAMPLE 3

Figure 7:
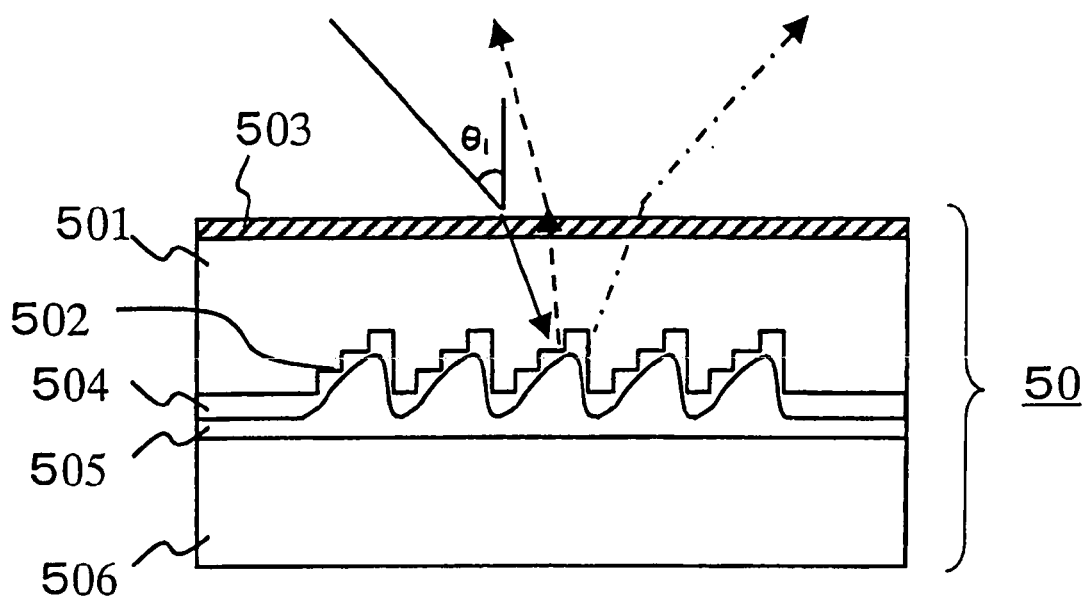
FIG. 7 is a side view showing the structure of the reflection type diffraction element according to Example 3.

FIG. 7 is a cross-sectional view showing the structure of the reflection type diffraction element of this example. In this Example, a quartz glass substrate having a thickness of 0.5 mm was used as a transparent substrate 501, and a pseudo sawtooth-like diffraction grating was formed in a surface of the substrate by using techniques of a photolithography method and a dry etching method. Namely, by etching two times to obtain depths of 0.36 µm and 0.18 µm, a pseudo sawtooth-like diffraction grating 102 having four levels (three steps) wherein each height of one step was 0.18 µm and the total depth (the sum of the steps) was 0.54 µm, was formed.

Then, in the surface of the transparent substrate 501 which was opposite to the surface having the pseudo sawtooth-like diffraction grating 502, a low-reflective film 503 as an antireflective film for a wavelength of 1.55 µm as the center wavelength was formed. On the pseudo sawtooth-like diffraction grating 502, a film of gold having a thickness of 0.8 µm was formed by a vacuum vapor deposition method to provide a high-reflective film 504 as a light-reflective film. On the high-reflective film 504, an epoxy adhesive was applied as an adhesive layer 505, and on the epoxy adhesive, a quartz glass substrate (a protecting member) having a thickness of 0.5 mm was stacked to form a protecting substrate 506.

Then, the quartz glass substrate was rotated so that the epoxy adhesive was made thin and uniform as the adhesive layer 505 to thereby form a laminated substrate comprising the transparent substrate 501, the protective substrate 506 and the adhesive layer 505 interposed therebetween. The thus prepared laminated substrate was cut into a rectangular shape of 10 mm×7 mm with a dicing saw to form a reflection type diffraction grating 50.

Light having a wavelength of 1.55 µm was incident with an external incident angle of θ=40° from the side of the low-reflective film 503 of the reflection type diffraction element 50. Diffraction efficiencies of a polarized light in parallel to the longitudinal direction of the grating (S polarization) and a polarized light perpendicular thereto (P polarization) were 73% and 70% respectively. These diffraction efficiencies are substantially equal. Even in the case of changing the wavelength of the incoming light from 1.5 µm to 1.6 µm, the change rates of the diffraction efficiencies were small as about ±5%. In FIG. 7, a solid arrow mark indicates the incoming light, a one-dotted chain line indicates the reflected light and a broken line indicates a 1st order diffraction light respectively.

INDUSTRIAL APPLICABILITY

As described above, in the diffraction element having concave/convex diffraction gratings in both surfaces according to the present invention, a diffraction grating is formed in an incoming-side surface of a glass substrate and at least one additional diffraction grating is formed in an outgoing-side surface thereof by processing in a linear shape or a curved shape in the glass substrate or an inorganic film formed on the glass substrate, wherein the grating pitch of the diffraction grating in the incoming-side surface is made equal to the grating pitch of the at least one diffraction grating in the outgoing-side surface. Accordingly, the diffraction element is of a small size, and is excellent in mass production and durability; is capable of taking out at least one diffracted and separated light in the same direction, and does not change substantially the direction of propagation of the diffraction light even though there is a change of operating environmental temperature.

Further, the reflection type diffraction grating of the present invention exhibits excellent diffraction efficiency without depending much on directions of polarization with respect to an incident angle of light to the reflection type diffraction element in comparison with the conventional reflection type diffraction element receiving light from the side of the diffraction grating. In addition, the reflection type diffraction element excellent in mass production and reliability can be realized.

The entire disclosures of Japanese Patent Application No. 2001-278063 filed on Sep. 13, 2001 and Japanese Patent Application No. 2002-112162 filed on Apr. 15, 2002 including specifications, claims, drawings and summaries are incorporated herein by reference in their entireties.

What is claimed is:

1. A diffraction element comprising:
    a substrate with an incoming-side surface opposite to an outgoing-side surface, the incoming-side surface configured to receive light from a light source external to the substrate;
    an incoming-side diffraction grating having a concave/convex shape in cross-section disposed in a central region of the incoming-side surface;
    a first outgoing-side diffraction grating having a concave/convex shape in cross-section disposed in the outgoing-side surface and configured to receive light not diffracted by the incoming-side diffraction grating; and
    a second outgoing-side diffraction grating covered by a reflective layer and having a concave/convex shape in cross-section, the second outgoing-side diffraction grating positioned on a light path of a light diffracted by said incoming-side diffraction grating, a grating pitch of the incoming-side diffraction grating being substantially equal to a grating pitch of the second outgoing-side diffraction grating,
    wherein the incoming-side diffraction grating is configured relative to the light source such that only a center portion of the external light, having a stronger intensity than a peripheral portion of the external light, is not diffracted by the incoming side diffraction grating.

2. The diffraction element according to claim 1, wherein the second outgoing-side diffraction grating forms a reflection type diffraction grating.

3. The diffraction element according to claim 2, wherein the second outgoing-side diffraction grating has a saw-tooth concave/convex portion or a pseudo sawtooth diffraction grating wherein a saw-tooth shape is approximated by stairs.

4. The diffraction element according to claim 2, wherein the second outgoing-side diffraction grating comprises a pseudo sawtooth diffraction grating having a saw-tooth shape approximated by stairs, and a height or depth of a first step of the stairs is different from a height or depth of a second step of the stairs.

5. The diffraction element according to claim 1, wherein the incoming side diffraction grating and the first outgoing-side diffraction grating are arranged in a main axis of the external light, both diffraction gratings being centered on the substrate.

* * * * *